United States Patent
Chioua et al.

(10) Patent No.: US 11,835,429 B2
(45) Date of Patent: Dec. 5, 2023

(54) APPARATUS FOR EQUIPMENT MONITORING

(71) Applicant: ABB Schweiz AG, Baden (CH)

(72) Inventors: Moncef Chioua, Montreal (CA); Subanatarajan Subbiah, Neulussheim (DE); Arzam Muzaffar Kotriwala, Ladenburg (DE); Ido Amihai, Bensheim (DE)

(73) Assignee: ABB Schweiz AG, Baden (CH)

( * ) Notice: Subject to any disclaimer, the term of this patent is extended or adjusted under 35 U.S.C. 154(b) by 78 days.

(21) Appl. No.: 17/480,163

(22) Filed: Sep. 21, 2021

(65) Prior Publication Data

US 2022/0003637 A1 Jan. 6, 2022
US 2022/0236144 A2 Jul. 28, 2022

Related U.S. Application Data

(63) Continuation of application No. PCT/EP2020/057505, filed on Mar. 18, 2020.

(30) Foreign Application Priority Data

Mar. 22, 2019 (EP) .................... 19164535

(51) Int. Cl.
*G06F 11/30* (2006.01)
*G01M 99/00* (2011.01)
(52) U.S. Cl.
CPC ................ *G01M 99/005* (2013.01)
(58) Field of Classification Search
CPC .................................................. G01M 99/005
See application file for complete search history.

(56) References Cited

U.S. PATENT DOCUMENTS

2007/0124113 A1 5/2007 Foslien et al.
2017/0356936 A1 12/2017 Ismail et al.

FOREIGN PATENT DOCUMENTS

JP 57-74627 A 5/1982
JP 62-8025 A 1/1987
(Continued)

OTHER PUBLICATIONS

Berli Kamiel et al.: "Impeller Fault Detection for a Centrifugal Pump Using Principal Component Analysis of Time Domain Vibration Features", Surveillance 7, International Conference—Full Papers, Oct. 5, 2013 (Oct. 5, 2013), XP055623661 (hereinafter 'Kamiel). (Year: 2013).*

(Continued)

*Primary Examiner* — Phuong Huynh
(74) *Attorney, Agent, or Firm* — Leydig, Voit & Mayer, Ltd.

(57) ABSTRACT

An apparatus for equipment monitoring includes an input unit, a processing unit, and an output unit. The input unit is configured to provide the processing unit with batches of temporal sensor data for an item of equipment. Each batch of temporal sensor data includes temporal sensor values as a function of time. The processing unit is configured to process the batches of temporal sensor data to determine batches of spectral sensor data. Each batch of spectral sensor data includes spectral sensor values as a function of frequency. The processing unit is configured to implement at least one statistical process algorithm to process the spectral sensor values for the batches of spectral sensor data to determine index values. For each batch of spectral sensor data there is an index value determined by each of the statistical process algorithms.

16 Claims, 2 Drawing Sheets

(56) References Cited

FOREIGN PATENT DOCUMENTS

| JP | 62-93620 A | | 4/1987 |
|---|---|---|---|
| JP | 3382240 B1 | | 3/2003 |
| JP | 2015-21901 A | | 2/2015 |
| JP | 2015201901 | * | 2/2015 |
| JP | 2017-198620 A | | 11/2017 |
| WO | WO 2017/217069 A1 | | 12/2017 |

OTHER PUBLICATIONS

Canadian Intellectual Property Office, Office Action in Canadian Patent Application No. 3,134,637, 4 pp. (dated Nov. 28, 2022)

Chioua et al., "Plant-wide Root Cause Identification of Transient disturbances with Application to a Board machine," 38 pp. (Apr. 27, 2016).

Kamiel et al., "Impeller Fault Detection for a Centrifugal Pump Using Principal Component Analysis of Time Domain Vibration Features," *Surveillance 7, International Conference—Full Papers*, 12 pp. (Oct. 5, 2013).

Kresta et al., "Multivariate Statistical Monitoring of Process Operating Performance," *The Canadian Journal of Chemical Engineering*, 69(1): 35-47 (Feb. 1991).

European Patent Office, International Preliminary Report on Patentability in International Patent Application No. PCT/EP2020/057505, 10 pp. (dated Sep. 28, 2021).

European Patent office, International Search Report in International Patent Application No. PCT/EP2020/057505, 4 pp. (dated Jun. 15, 2020).

European Patent Office, Written Opinion in International Patent Application No. PCT/EP2020/057505, 9 pp. (dated Jun. 15, 2020).

European Patent Office, Extended European Search Report in European Patent Application No. 19164535.7. 12 pp. (dated Oct. 8, 2019)

Kresta, J.V.: Multivariate statistical monitoring of process operating performance. The Canadian Journal of Chemical Engineering, 69(1), 1991, pp. 35-47.

\* cited by examiner

APPARATUS FOR EQUIPMENT MONITORING

CROSS-REFERENCE TO PRIOR APPLICATION

This application is a continuation of International Patent Application No. PCT/EP2020/057505, filed on Mar. 18, 2020, which claims priority to European Patent Application No. EP 19164535.7, filed on Mar. 22, 2019. The entire disclosure of both applications is hereby incorporated by reference herein.

FIELD

One or more embodiments of present invention may relate to an apparatus for equipment monitoring, a system for equipment monitoring, a method for equipment monitoring, and/or to a computer program element and computer readable medium.

BACKGROUND

Currently in process industries, inspection and maintenance of equipment with moving parts, such as rotating parts, predominantly contributes to operational expenses. Condition monitoring of, for example, rotating equipment typically relies on the collection and the analysis of various types of sensors, for example acceleration, velocity, and displacement sensors, microphones, acoustic arrays, torque meters, encoders, tachometers, image cameras, fiber optic sensors, thermal sensors, and stress sensors. Signal processing based algorithms are then used to compute heath indicators for various failure modes of various equipment types, for example pumps, gearboxes, and bearings. These health indicators are then tracked to detect, or are extrapolated to predict, specific equipment failures.

Several solutions for the monitoring of rotating equipment are known. These typical rely on the monitoring of simple indices, such as the ISO 10186-1,7 that reflects the overall level of vibration and is compared to a predefined threshold that is generally set conservatively.

Indices related to specific faults of specific components, for example, bearings, gearboxes, pumps, in associated with signal processing methods have also been implemented. However, the industrial use of such advanced indices still suffers from the necessity to define specific detection thresholds for each rotating equipment that varies with the load, the rotating speed and other operating parameters. Because of the lack of an ability to systematically select such thresholds, these methods are tedious and time consuming to implement.

There is a need to address this issue.

SUMMARY

In an embodiment, the present invention provides an apparatus for equipment monitoring. The apparatus may include an input unit, a processing unit, and an output unit. The input unit may be configured to provide the processing unit with a plurality of batches of temporal sensor data for an item of equipment, where each batch of temporal sensor data may include a plurality of temporal sensor values as a function of time. The processing unit may be configured to process the plurality of batches of temporal sensor data to determine a plurality of batches of spectral sensor data, where each batch of spectral sensor data may include a plurality of spectral sensor values as a function of frequency. The processing unit may be configured to implement at least one statistical process algorithm to process the plurality of spectral sensor values for the plurality of batches of spectral sensor data to determine a plurality of index values, where for each batch of spectral sensor data there may be an index value determined by each of the statistical process algorithms. Each statistical process algorithm may have an associated threshold value, and where the processing unit may be configured to utilise the at least one threshold value and the plurality of index values to determine a batch of spectral sensor data of interest that has an index value greater than the threshold value for the associated statistical process algorithm. The processing unit may be configured to determine a frequency range of interest on the basis of the plurality of spectral sensor values for the batch of spectral sensor data of interest.

In another embodiment, the present invention provides a method for equipment monitoring. The method may include providing a plurality of batches of temporal sensor data for an item of equipment, where each batch of temporal sensor data may include a plurality of temporal sensor values as a function of time. The method may further include processing the plurality of batches of temporal sensor data to determine a plurality of batches of spectral sensor data, where each batch of spectral sensor data may include a plurality of spectral sensor values as a function of frequency. The method may also include implementing at least one statistical process algorithm to process the plurality of spectral sensor values for the plurality of batches of spectral sensor data to determine a plurality of index values, where for each batch of spectral sensor data there may be an index value determined by each of the statistical process algorithms. The method may include utilising a threshold value for each statistical process algorithm and the plurality of index values to determine a batch of spectral sensor data of interest that may have an index value greater than the threshold value for the associated statistical process algorithm; and determining a frequency range of interest on the basis of the plurality of spectral sensor values for the batch of spectral sensor data of interest.

Therefore, it may be advantageous to have an improved ability to monitor equipment with moving parts in order to detect if the equipment is or will deteriorate or become damaged.

An object of the present invention may be solved with the subject matter of the independent claims, wherein further embodiments may be incorporated in the dependent claims.

BRIEF DESCRIPTION OF THE DRAWINGS

One or more embodiments of the present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
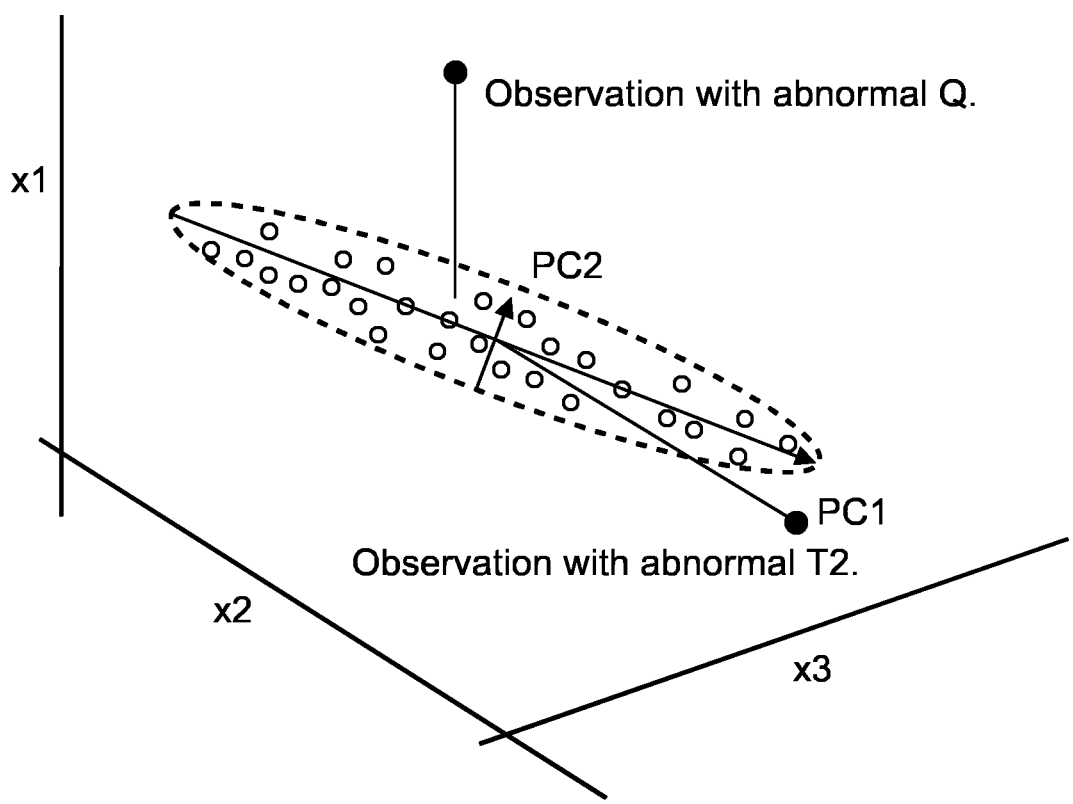
FIG. 1 shows an example of principal component space spanned by two principal components and residual space for a dataset of three process variables in accordance with one or more embodiments.

In a first aspect, there is provided an apparatus for equipment monitoring, the apparatus comprising:
an input unit;
a processing unit; and
an output unit.

The input unit is configured to provide the processing unit with a plurality of batches of temporal sensor data for an item of equipment. Each batch of temporal sensor data comprises a plurality of temporal sensor values as a function of time. The processing unit is configured to process the plurality of batches of temporal sensor data to determine a plurality of batches of spectral sensor data. Each batch of spectral sensor data comprises a plurality of spectral sensor values as a function of frequency. The processing unit is configured to implement at least one statistical process algorithm to process the plurality of spectral sensor values for the plurality of batches of spectral sensor data to determine a plurality of index values. For each batch of spectral sensor data there is an index value determined by each of the statistical process algorithms. Each statistical process algorithm has an associated threshold value, and the processing unit is configured to utilise the at least one threshold value and the plurality of index values to determine a batch of spectral sensor data of interest that has an index value greater than the threshold value for the associated statistical process algorithm. The processing unit is configured to determine a frequency range of interest on the basis of the plurality of spectral sensor values for the batch of spectral sensor data of interest.

In this manner, an unsupervised technique for the monitoring industrial equipment, such as rotating equipment, is enabled. An abnormal increase of the overall level of a sensed value, such as vibration, is detected and the spectral components most correlated to the detected abnormal increase of the sensed value are isolated. The analyst can therefore have a first indication of the type of fault affecting the equipment based on the knowledge of the spectral components contributing to the increase of the overall sensed value level, such as vibration of rotating equipment.

In other words, a higher level of insight is provided for the diagnostic system above a simple variation of a sensed value, such as vibration, where the new technique enables an abnormal sensed value level to be detected and the associated spectral (frequencies components) determined that are the main cause of that abnormality to be identified.

In an example, a time period between adjacent batches of temporal sensor data is greater than a time period between adjacent sensor data within a batch.

In an example, the at least one statistical process algorithm comprises Hotelling's statistic.

In an example, for each batch of spectral sensor data there is an index value determined by the Hotelling's statistic.

In an example, the batch of spectral sensor data of interest is determined when the index value determined by the Hotelling's statistic for that batch is greater than the threshold value associated with the Hotelling's statistic.

In an example, the at least one statistical process algorithm comprises Squared Prediction Error or Q statistic.

In an example, for each batch of spectral sensor data there is an index value determined by the Squared Prediction Error or Q statistic.

In an example, the batch of spectral sensor data of interest is determined when the index value determined by the Squared Prediction Error or Q statistic for that batch is greater than the threshold value associated with the Squared Prediction Error or Q statistic.

In an example, the batch of spectral sensor data of interest is determined when the index value determined by the Hotelling's statistic for that batch is greater than the threshold value associated with the Hotelling's statistic; or wherein the batch of spectral sensor data of interest is determined when the index value determined by the Squared Prediction Error or Q statistic for that batch is greater than the threshold value associated with the Squared Prediction Error or Q statistic.

In other words, both indices (determined using T2 Hotelling's statistic of the SPE or Q statistic) are monitored separately and if one of them exceeds its limit, the analysis of the corresponding batch is performed to determine the spectral frequencies that are problematic.

To put this another way, two independent statistical control charts (calculated indices or index values for batches) are used to detect abnormal observations by comparing them to threshold limits. The Hotelling's T2 statistic is used in the principal component space, and the Squared Prediction Error (SPE or Q) statistic is used in the residual space.

In an example, determination of the plurality of batches of spectral sensor data comprises utilization of a Fourier Transform algorithm on the temporal sensor values for each batch of the plurality of batches of temporal sensor data.

In an example, processing unit is configured to sub-divide the spectral values for the batch of spectral data or interest into a plurality of frequency ranges. The frequency range of interest is determined as a frequency range that exhibits a value greater than values associated with the other frequency ranges.

In a second aspect, there is provided a system for equipment monitoring, the system comprising at least one sensor configured to acquire the plurality of batches of temporal sensor data, and an apparatus for equipment monitoring according to the first aspect.

In a third aspect, there is provided a method for equipment monitoring, the method comprising:
a) providing a plurality of batches of temporal sensor data for an item of equipment, wherein each batch of temporal sensor data comprises a plurality of temporal sensor values as a function of time;
b) processing the plurality of batches of temporal sensor data to determine a plurality of batches of spectral sensor data, wherein each batch of spectral sensor data comprises a plurality of spectral sensor values as a function of frequency;
c) implementing at least one statistical process algorithm to process the plurality of spectral sensor values for the plurality of batches of spectral sensor data to determine a plurality of index values, wherein for each batch of spectral sensor data there is an index value determined by each of the statistical process algorithms;
d) utilising a threshold value for each statistical process algorithm and the plurality of index values to determine a batch of spectral sensor data of interest that has an index value greater than the threshold value for the associated statistical process algorithm; and
e) determining a frequency range of interest on the basis of the plurality of spectral sensor values for the batch of spectral sensor data of interest.

According to another aspect, there is provided a computer program element controlling apparatus or system as previously described which, when the computer program element is executed by a processing unit, is adapted to perform the method steps as previously described.

According to another aspect, there is also provided a computer readable medium having stored the computer element as previously described.

The above aspects and examples will become apparent from and be elucidated with reference to the embodiments described hereinafter.

Figure 2:
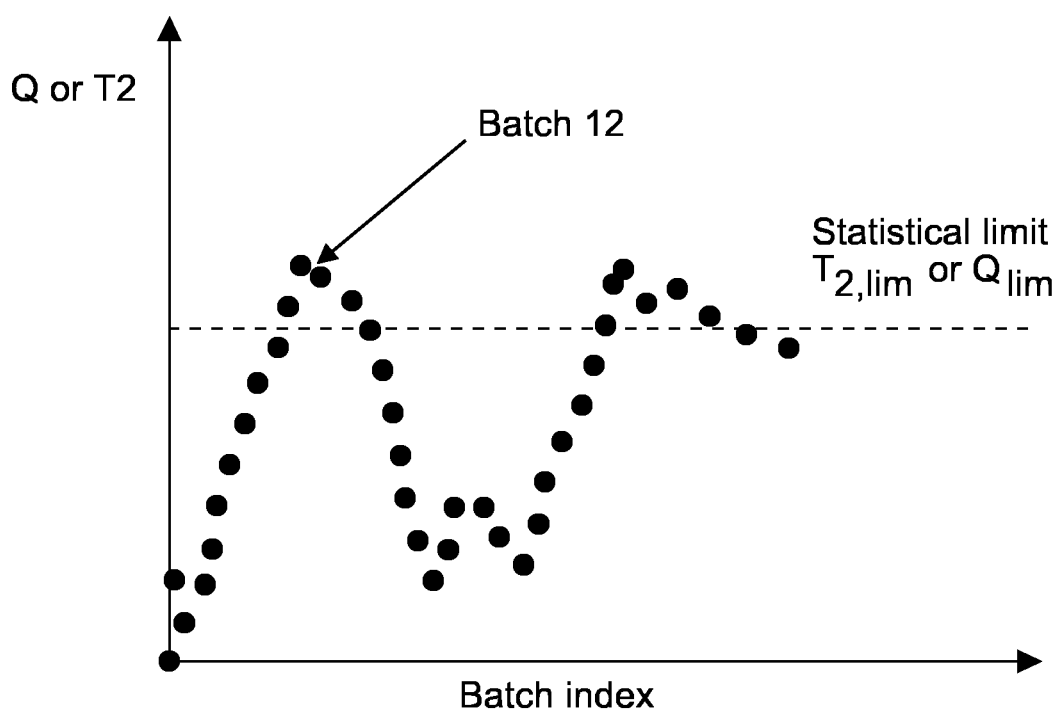
FIG. 2 shows a schematic representation of example of the determined indices for different batches calculated using T2 Hotelling's statistic or calculated using the PRE or Q statistic with respect to a statistical limit for one of those statistics in accordance with one or more embodiments.
Figure 3:
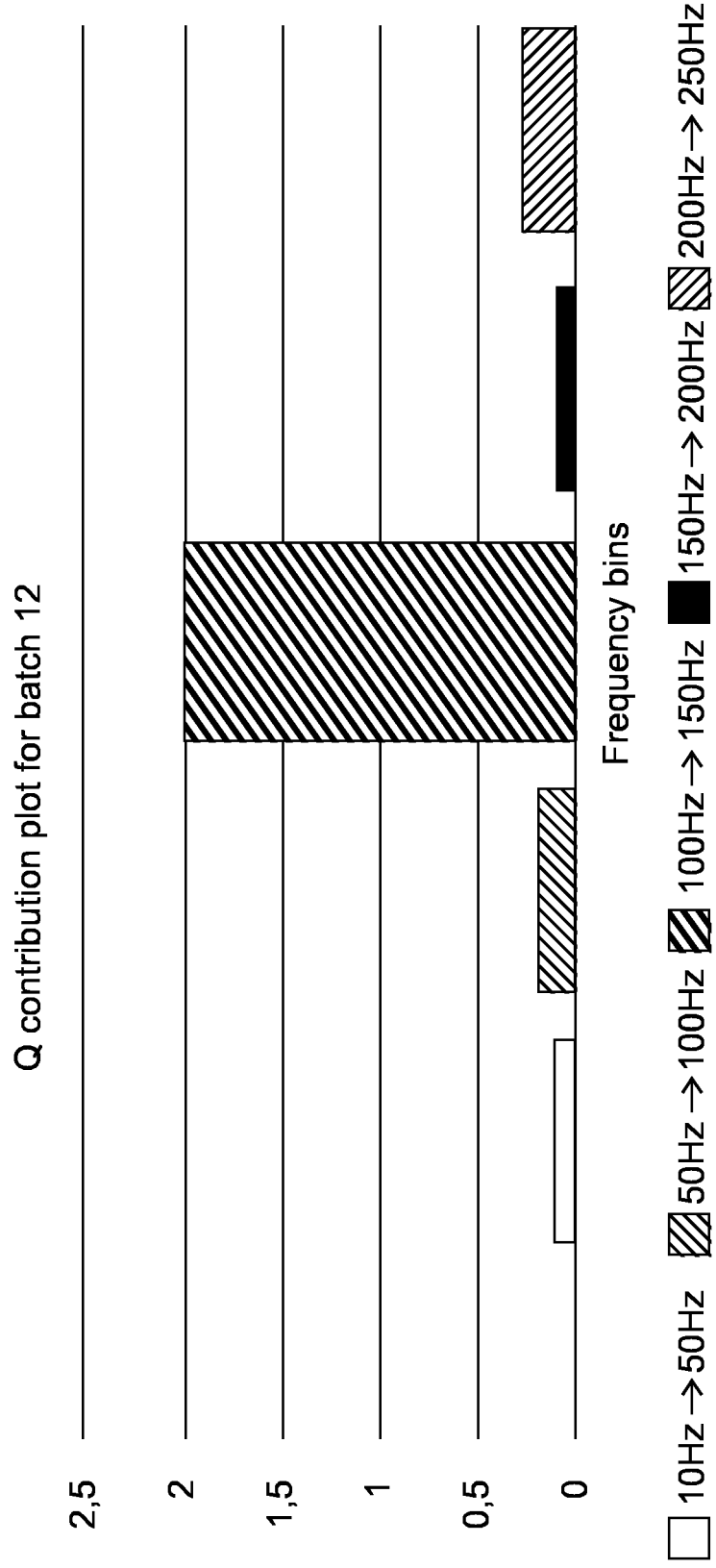
FIG. 3 shows an example of the spectral frequency energy spectrum for a batch that exceeded the statistical limit in accordance with one or more embodiments.

The presently provided apparatus, system and method for equipment monitoring are now described in detail, where reference is made to FIGS. 1-3. An example of the apparatus for equipment monitoring comprises an input unit, a processing unit, and an output unit. The input unit is configured to provide the processing unit with a plurality of batches of temporal sensor data for an item of equipment. Each batch of temporal sensor data comprises a plurality of temporal sensor values as a function of time. The processing unit is configured to process the plurality of batches of temporal sensor data to determine a plurality of batches of spectral sensor data. Each batch of spectral sensor data comprises a plurality of spectral sensor values as a function of frequency. The processing unit is configured to implement at least one statistical process algorithm to process the plurality of spectral sensor values for the plurality of batches of spectral sensor data to determine a plurality of index values. For each batch of spectral sensor data there is an index value determined by each of the statistical process algorithms. Each statistical process algorithm has an associated threshold value, and the processing unit is configured to utilise the at least one threshold value and the plurality of index values to determine a batch of spectral sensor data of interest that has an index value greater than the threshold value for the associated statistical process algorithm. The processing unit is configured to determine a frequency range of interest on the basis of the plurality of spectral sensor values for the batch of spectral sensor data of interest.

Thus, the apparatus can be operating in real time and be at the site of the equipment, and monitor that equipment. Or, the apparatus can analyse data that was previously acquired in order to determine anomalous behaviour, and what frequencies are those that are problematic.

According to an example, a time period between adjacent batches of temporal sensor data is greater than a time period between adjacent sensor data within a batch.

In an example, the time period between adjacent batches of temporal sensor data is one of: 1 hour; 2 hours; 3 hours; 4 hours; 5 hours; 6 hours; 7 hours; 8 hours; 12 hours; 24 hours. The time period between batches can be different to that described above.

In an example, the time period between adjacent sensor data within a batch is one of: 0.0001 s; 0.0005 s; 0.001 s; 0.002 s; 0.003 s; 0.004 s; 0.005 s; 0.01 s; 0.02 s; 0.05 s.

In an example, each batch of sensor data was acquired over a time period of one of: 10 s; 20 s; 30 s; 60 s; 120 s.

Thus, for example a sensor can acquire data at a rate of 1 kHz for 60 seconds. Then, wait for 6 hours, and again acquired data at a rate of 1 kHz for 60 seconds. However, different rates of sensor data acquisition for different periods of time, and with different durations between batches of sensor data can be utilized.

According to an example, the at least one statistical process algorithm comprises Hotelling's statistic.

According to an example, for each batch of spectral sensor data there is an index value determined by the Hotelling's statistic.

According to an example, the batch of spectral sensor data of interest is determined when the index value determined by the Hotelling's statistic for that batch is greater than the threshold value associated with the Hotelling's statistic.

According to an example, the at least one statistical process algorithm comprises Squared Prediction Error or Q statistic.

According to an example, for each batch of spectral sensor data there is an index value determined by the Squared Prediction Error or Q statistic.

According to an example, the batch of spectral sensor data of interest is determined when the index value determined by the Squared Prediction Error or Q statistic for that batch is greater than the threshold value associated with the Squared Prediction Error or Q statistic.

According to an example, the batch of spectral sensor data of interest is determined when the index value determined by the Hotelling's statistic for that batch is greater than the threshold value associated with the Hotelling's statistic. Alternatively, the batch of spectral sensor data of interest is determined when the index value determined by the Squared Prediction Error or Q statistic for that batch is greater than the threshold value associated with the Squared Prediction Error or Q statistic.

According to an example, determination of the plurality of batches of spectral sensor data comprises utilization of a Fourier Transform algorithm on the temporal sensor values for each batch of the plurality of batches of temporal sensor data.

In an example, the Fourier Transform algorithm is a Fast Fourier Transform algorithm.

According to an example, processing unit is configured to sub-divide the spectral values for the batch of spectral data or interest into a plurality of frequency ranges, and wherein the frequency range of interest is determined as a frequency range that exhibits a value greater than values associated with the other frequency ranges.

In an example, the frequency range of interest is determined as a frequency range that exhibits a spectral power value greater than spectral power values associated with the other frequency ranges.

In an example, the sensor data are rotational sensor data.

Thus, it is appreciated that the above described apparatus when coupled to at least one sensor that acquires the plurality of batches of temporal sensor data, provides a system for equipment monitoring.

Also, an example relates to a method for equipment monitoring, the method comprising:

a) providing a plurality of batches of temporal sensor data for an item of equipment, wherein each batch of temporal sensor data comprises a plurality of temporal sensor values as a function of time;

b) processing the plurality of batches of temporal sensor data to determine a plurality of batches of spectral sensor data, wherein each batch of spectral sensor data comprises a plurality of spectral sensor values as a function of frequency;

c) implementing at least one statistical process algorithm to process the plurality of spectral sensor values for the plurality of batches of spectral sensor data to determine a plurality of index values, wherein for each batch of spectral sensor data there is an index value determined by each of the statistical process algorithms;

d) utilising a threshold value for each statistical process algorithm and the plurality of index values to determine a batch of spectral sensor data of interest that has an index value greater than the threshold value for the associated statistical process algorithm; and e) determining a frequency range of interest on the basis of the plurality of spectral sensor values for the batch of spectral sensor data of interest.

In an example, a time period between adjacent batches of temporal sensor data is greater than a time period between adjacent sensor data within a batch.

In an example, the time period between adjacent batches of temporal sensor data is one of: 1 hour; 2 hours; 3 hours; 4 hours; 5 hours; 6 hours; 7 hours; 8 hours; 12 hours; 24 hours.

In an example, the time period between adjacent sensor data within a batch is one of: 0.0001 s; 0.0005 s; 0.001 s; 0.002 s; 0.003 s; 0.004 s; 0.005 s; 0.01 s; 0.02 s; 0.05 s.

In an example, each batch of sensor data was acquired over a time period of one of: 10 s; 20 s; 30 s; 60 s; 120 s.

In an example, in step c) the at least one statistical process algorithm comprises Hotelling's statistic.

In an example, for each batch of spectral sensor data there is an index value determined by the Hotelling's statistic.

In an example, in step d) the batch of spectral sensor data of interest is determined when the index value determined by the Hotelling's statistic for that batch is greater than the threshold value associated with the Hotelling's statistic.

In an example, in step c) the at least one statistical process algorithm comprises Squared Prediction Error or Q statistic.

In an example, for each batch of spectral sensor data there is an index value determined by the Squared Prediction Error or Q statistic.

In an example, in step d) the batch of spectral sensor data of interest is determined when the index value determined by the Squared Prediction Error or Q statistic for that batch is greater than the threshold value associated with the Squared Prediction Error or Q statistic.

In an example, the batch of spectral sensor data of interest is determined when the index value determined by the Hotelling's statistic for that batch is greater than the threshold value associated with the Hotelling's statistic. Alternatively the batch of spectral sensor data of interest is determined when the index value determined by the Squared Prediction Error or Q statistic for that batch is greater than the threshold value associated with the Squared Prediction Error or Q statistic.

In an example, step b) comprises utilizing a Fourier Transform algorithm on the temporal sensor values for each batch of the plurality of batches of temporal sensor data.

In an example, the Fourier Transform algorithm is a Fast Fourier Transform algorithm.

In an example, the sensor data are rotational sensor data.

The following detailed description relates to the monitoring of rotating equipment. In the new approach, multivariate statistical process control is used in a new way. MSPC has been used to monitor an industrial process, and to support the process operator or the process engineer in troubleshooting process abnormal situations—see; Kresta, J. V., Macgregor, J. F., & Marlin, T. E. (1991). Multivariate statistical monitoring of process operating performance. *The Canadian Journal of Chemical Engineering*, 69(1), 35-47.

However, this approach in a varied form has been used for the monitoring of equipment, such as rotating equipment. While the standard MSPC approach uses time series collected from process sensors, it has been found that rotating equipment can be better characterized by spectral signatures. It has been found that faults or malfunctions in rotating equipment have signatures that are localized in the frequency domain but not necessarily localized in the time domain because of the periodicity induced by the rotation.

In summary, in the new technique the T2 Hotelling's index and the Q or Squared Prediction Error (SPE) indices are computed for each batch of collected sensor values and compared to adequate statistical limits. In a specific example, "vibration" measurements are performed in a "batch" manner i.e. the measurements are periodically recorded for a given time duration. The acceleration/velocity sensor data measurements is recorded every 6 hours for example. Below, reference is made to the time index k, where k=1, 2, 3, . . . ,n means a batch of data is acquired at relative time 6 hours, 12 hours, 18 hours, . . . , nx6 hours) for a duration of for example one minute at a rate of 1 KHz. Thus, in this specific example each batch or record of data acquired every 6 hours has 1000×60=60000 data samples or values.

T2 Hotelling's and Q contribution plots are determined from one or more identified batches of the plurality of batches acquired every 6 hours. The T2 and Q contribution plots are then used to evaluate the frequency bins most correlated to the T2 and Q indices deviations from their corresponding statistical limits. This indication allows the user to monitor the change in the spectrum of the vibration signal and helps the user to understand the type of fault the rotating equipment is encountering.

Thus, two independent statistical control charts are used to detect abnormal observations by comparing them to threshold limits. The Hotelling's T2 statistic is used in the principal component space, the Squared Prediction Error (SPE or Q) statistic is used in the residual space.

Monitoring in the Principal Component Space

The Hotelling's statistic is used as the scores follow a Gaussian multivariate distribution. The scores have a zero mean and the estimated sample covariance matrix $S=1/n-1$ $t^T t \in R \times R$ is a diagonal matrix. For an observation $x_{test} \in R^{1 \times m}$ the Hotelling's statistic on the t-scores is given by $$T^2 = x P \Lambda^{-1}_{1:NPC} P^T x^T = T \Lambda^{-1}_{1:NPC} T^T$$

Where P is a matrix whose columns are the loading vectors, NPC is the number of principal components retained in the model, $\Lambda_{1:NPC}$ is a diagonal matrix whose elements are the eigenvalues of the sample covariance matrix (the singular values of the data matrix X) retained in the model in descending order of magnitude. T are the scores in the principal component space.

The Hotelling's T2 statistic is the sum of scaled scores. It combines information from all the scores into a single index. Only the loadings corresponding to the larger singular values are included when computing the T2 statistic. The smaller singular values which correspond to noise are inverted in the computation of this statistic. Excluding these smaller singular values allows a better representation of the process behavior and a robust abnormality detection inside the model. The T2 statistic is the distance between the projection of an observation to the principal component space and the origin of the principal component space. The threshold T2α of the T2 is computed using $$T^2 \leq T_\alpha^2 = \frac{(N^2-1)NPC}{N(N-NPC)} F_\alpha(NPC, N-NPC)$$

Where a is the confidence level, N the number of observations in the data matrix. $F_\alpha(NPC,N-NPC)$ is the 100×α % critical point of the Fisher-Distribution with NPC, N-NPC degrees of freedom. From the above equations the control limits for the scores can be derived $$\left(\frac{t_1}{\lambda_1}\right)^2 + \left(\frac{t_2}{\lambda_2}\right)^2 + \cdots + \left(\frac{t_{NPC}}{\lambda_{NPC}}\right)^2 \le T_\alpha^2$$

The above equation describes an ellipsoidal region of confidence for the scores (see FIG. 1 for an example with m=3, NPC=2). The individual contributions of the variables to $T^2$ at a given observation is given by $$T^2_{contribution} = T \cdot \Lambda^{-1/2}_{1:NPC} \cdot P^T$$

Monitoring in the Residual Space

The monitoring in the residual space uses the Q statistic defined as, $$Q = e_i e^t_i$$

Where $e_i$ are the row vectors of the error matrix E. The Q statistic is the Euclidean norm of the deviations of observations from their projection onto the principal component space. The control limit of Q can be approximated as $$Q_a = \theta_1 \left[ \frac{h_a e_a \sqrt{2\theta_2}}{\theta_1} + 1 + \frac{\theta_2 h_0 (h_0 - 1)}{\theta_1^2} \right]^{1/h_0}$$

Where ca is the value of the normal distribution corresponding to 1−α percentile, $$\theta_1 = \sum_{j=NPC \to 1}^{n} \lambda_j^i \text{ and } h_0 = 1 - \frac{2\theta_1 \theta_2}{3\theta_2^2}.$$

The control limit $Q_\alpha$ represents the threshold of random variations in the process. The individual contributions of the variables to Q at a given observation are given by the elements of E corresponding to the observation.

Referring to FIG. 1 this shows a dataset comprising three variables. It can be seen that the three dimensional data points (hollow circles) can be reduced to two dimensions spanned by the principal components with the first principal component having higher explained variance (along the major axis of the ellipse) and the second principal component (minor axis of the ellipse). Considering a new observation (the solid circle labelled PC1), this new observation lies in the two dimensional space spanned by the principal components but lies outside the control limits of the scores $T^2_\alpha$. The new data point marked by the other solid circle when projected into the principal component space is found to be acceptable although the data point is different from the other points in the model. This variation is captured by the Q statistic.

Thus, Multivariate Statistical Process Control (MSPC) has been used in a new way to monitor industrial equipment. Principal Component Analysis (PCA) can be utilized. PCA allows representing a dataset on a lower dimensional space. Additionally, it separates the observation space into two subspaces. One subspace captures the process trends while the other subspace captures the effects of random noise or of new abnormal variations which are not part of the model.

Let the data matrix $X \in R^{n \times m}$ have of n observations collected from m sensors. PCA is a data reduction technique which extracts the maximum variance in the data, in orthogonal directions called the principal components. These principal components are linear combinations of the variables which contain useful information (variability of the process data). PCA decomposes the data matrix into orthogonal vectors called loading vectors (p) and score vectors (t). The decomposition is done using a Singular Value Decomposition (SVD) of the data matrix X:

$$\frac{1}{\sqrt{n-1}} X = U \Sigma V^T$$

Where $\Sigma \in R^{n \times m}$ contains the real, non-negative singular values in order of decreasing magnitude $(\sigma_1 > \sigma_2 > \ldots > \sigma_{min(m,n)})$. The right eigenvectors $V \in R^{m \times m}$ are the loading vectors. In order to avoid modeling noise present in the data, only the r larger eigenvalues and their corresponding loading vectors, $p = V(:,1:r)$, $p \in R^{m \times r}$ are retained. The amount of variance captured in the direction of a principal component i is $$\frac{\sigma_i}{\sum_{j=1}^{j=r} \sigma_j}.$$

The data matrix X when projected on the space formed by the independent loading vectors (p) is $$t = X \cdot p$$

Where $t \in R^{n \times r}$ is called the score matrix and the columns of t are orthogonal. The variance captured by the first column of score matrix $t_1$, which corresponds to the first principal component of X, is greater than that of the variance captured by the second column $t_2$. The projection of the scores back to the original m dimensional space gives, $$\hat{X} = t \cdot p^T$$

Where g is the modeled information. The difference between X and g is called the residual matrix E and the space spanned by the residual matrix is called the residual space. This residual space corresponds to the variance in the smaller eigenvalues that were not included in the model.

$$X = \hat{X} + E = t \cdot p^T + E$$

To test a new observation vector $x_{test} \in R^{1 \times m}$, the vector is projected on the model. The projection of the test vector on the space formed by the loading vectors gives the score of the test data $$t_{test} = X_{test} \cdot P$$

Thus, returning to the acquisition of and processing of sensor data, let $x_k(t)$ represent the vector of collected sensor values e.g. accelerometer measurements collected stating at time k over a time interval T.

$$x_k(t) = [x(k+1), x(k+2), \ldots x(k+T)]$$

Let $X_k(f)$ be the spectrum of $x_k(t)$ computed using for example a Fast Fourier Transform FFT algorithm over the time interval (k, k+T). $X_k(f)$ is computed for each batch of collected sensor values. k=1, 2, 3, 4, . . . n where n is the number of batches at m frequency channels. As discussed above, each batch can be acquired every 6 hours and each batch can have 6000 data samples for example acquired every 0.001 second. However, each batch can be acquired with different time periods between them, such that for example there is 2 hours between two batches, then the next batch was acquired after 6 hours for example. However, the sensor value is read ever Ts seconds (e.g. every 0.001 s) within a batch.

Thus, a batch is series of sensor values collected during a time interval T. For each batch a Fourier transform is computed in order to estimate the corresponding power spectrum. The actual implementation of the power spectrum relies on a numerical algorithm that compute the Fourier transform: Fast Fourier Transform algorithm (FFT). The FFT compute a discretized spectrum i.e. value of spectrum at a finite number of frequencies. The frequencies or frequency bands at which the power spectrum is evaluated are called "frequency channels".

Overlaying the computed spectra for all the batches leads to the following matrix $$X = \begin{bmatrix} X_{11} & \cdots & X_{1m} \\ \vdots & \ddots & \vdots \\ X_{1n} & \cdots & X_{nm} \end{bmatrix} \text{Batch index 1-n}$$
$$\underbrace{\phantom{XXXXXXXXXX}}_{\text{Frequency bin index: 1-m}}$$

A principal component (PCA) decomposition of X lead to the following approximation:

$$X = \hat{X} + E = tp' + E$$

With $$\tilde{X} = \begin{bmatrix} \tilde{X}_{11} & \cdots & \tilde{X}_{1p} \\ \vdots & \ddots & \vdots \\ \tilde{X}_{1n} & \cdots & \tilde{X}_{np} \end{bmatrix}$$

Batch index 1-n

Principal component index 1-p and E is residual (approximation) error, t is the vector of scores and p the vector of loadings.

The T2 Hotelling's index and the Q (SPE) indices are then computed for each batch index and compared to adequate statistical limits. This is shown in FIG. 2. In FIG. 2 the T2 Hotelling's index and PRE or Q index is calculated for each batch, where as discussed above k is the batch (dataset index). As shown in FIG. 2 batch 12 is over the limit, where for simplicity only one set of index values is shown calculated for the T2 Hotelling's statistic and only one threshold shown, but there are in effect two plots one for the T2 Hotelling's statistic and one for the PRE or Q statistical analysis. Thus, as shown the batch k=12 is above the statistical limit $T2_{lim}$ or to $Q_{lim}$. This batch, and other batches above the statistical limit $T2_{lim}$ or to $Q_{lim}$, is associated with an abnormal level of vibration. Therefore these datasets (batches) are then investigated, by analyzing the contribution plot in order to determine which frequency(ies) explain most the high value of T2 or of Q. such a contribution plot is shown in FIG. 3 for batch 12, and is determined from the FFT determined energy spectral content for that batch that has an abnormal level of vibration. In this way the T2 and Q contribution plots are used to evaluate the frequency bins most correlated to the T2 and Q indices deviations from their corresponding statistical limits. In the FIG. 3, the frequency bin [100 Hz-150 Hz] for batch 12 is significantly higher than the other spectral components indicating that the detected change in the Q or T2 index is explained by the presence of a component in the [100 Hz-150 Hz] frequency range. This indication allows the user to monitor the change in the spectrum of the vibration signal and help him understand the type of fault the rotating equipment is encountering.

In another exemplary embodiment, a computer program or computer program element is provided that is characterized by being configured to execute the method steps of the method according to one of the preceding embodiments, on an appropriate system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

According to a further exemplary embodiment of the present invention, a computer readable medium, such as a CD-ROM, is presented wherein the computer readable medium has a computer program element stored on it which computer program element is described by the preceding section.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An apparatus for equipment monitoring, the apparatus comprising:
an input unit;
a processing unit; and
an output unit;
wherein the input unit is configured to provide the processing unit with a plurality of batches of temporal sensor data for an item of equipment, wherein each batch of temporal sensor data comprises a plurality of temporal sensor values as a function of time;
wherein the processing unit is configured to process the plurality of batches of temporal sensor data to determine a plurality of batches of spectral sensor data, wherein each batch of spectral sensor data comprises a plurality of spectral sensor values as a function of frequency;
wherein the processing unit is configured to implement at least one statistical process algorithm to process the plurality of spectral sensor values for the plurality of batches of spectral sensor data to determine a plurality of index values, wherein for each batch of spectral sensor data there is an index value determined by each of the statistical process algorithms, the index value being determined from a Fast Fourier Transform algorithm (FFT) determined energy spectral content for that batch;
wherein each statistical process algorithm has an associated threshold value, and wherein the processing unit is configured to utilize the at least one threshold value and the plurality of index values to determine a batch of spectral sensor data of interest that has an index value greater than the threshold value for the associated statistical process algorithm;
wherein the processing unit is configured to sub-divide the spectral values for the batch of spectral data of interest into a plurality of frequency ranges;
wherein the processing unit is configured to determine a frequency range of interest on the basis of the plurality of spectral sensor values for the batch of spectral sensor data of interest;
wherein the frequency range of interest is determined as a frequency range that exhibits a value greater than values associated with the other frequency ranges; and
wherein the output unit is configured to output an indication of the frequency range of interest to a user.

2. The apparatus according to claim 1, wherein a time period between adjacent batches of temporal sensor data is greater than a time period between adjacent sensor data within a batch.

3. The apparatus according to claim 1, wherein the at least one statistical process algorithm comprises Hotelling's statistic.

4. The apparatus according to claim 3, wherein for each batch of spectral sensor data there is an index value determined by the Hotelling's statistic.

5. The apparatus according to claim 3, wherein the batch of spectral sensor data of interest is determined when the index value determined by the Hotteling's statistic for that batch is greater than the threshold value associated with the Hotteling's statistic.

6. The apparatus according to claim 1, wherein the at least one statistical process algorithm comprises Squared Prediction Error or Q statistic.

7. The apparatus according to claim 6, wherein for each batch of spectral sensor data there is an index value determined by the Squared Prediction Error or Q statistic.

8. The apparatus according to claim 5, wherein the batch of spectral sensor data of interest is determined when the index value determined by the Squared Prediction Error or Q statistic for that batch is greater than the threshold value associated with the Squared Prediction Error or Q statistic.

9. The apparatus according to claim 8, wherein:
the batch of spectral sensor data of interest is determined when the index value determined by the Hotelling's statistic for that batch is greater than the threshold value associated with the Hotelling's statistic, or
the batch of spectral sensor data of interest is determined when the index value determined by the Squared Prediction Error or Q statistic for that batch is greater than the threshold value associated with the Squared Prediction Error or Q statistic.

10. The apparatus according to claim 1, wherein determination of the plurality of batches of spectral sensor data comprises utilization of a Fourier Transform algorithm on the temporal sensor values for each batch of the plurality of batches of temporal sensor data.

11. A system for equipment monitoring, the system comprising:
at least one sensor; and
the apparatus for equipment monitoring according to claim 1;
wherein the at least one sensor is configured to acquire the plurality of batches of temporal sensor data.

12. The apparatus according to claim 1, wherein the indication of the frequency range of interest to the user is a health indicator for the equipment.

13. The apparatus according to claim 12, wherein the processing unit is configured to:
track the health indicator for the equipment; and
predict a specific equipment failure for the equipment based on tracking the health indicator.

14. The apparatus according to claim 13, wherein the equipment is a rotating equipment comprising one or more rotating parts.

15. A computer-implemented method for equipment monitoring, the method comprising:
providing a plurality of batches of temporal sensor data for an item of equipment, wherein each batch of temporal sensor data comprises a plurality of temporal sensor values as a function of time;
processing the plurality of batches of temporal sensor data to determine a plurality of batches of spectral sensor data, wherein each batch of spectral sensor data comprises a plurality of spectral sensor values as a function of frequency;
implementing at least one statistical process algorithm to process the plurality of spectral sensor values for the plurality of batches of spectral sensor data to determine a plurality of index values, wherein for each batch of spectral sensor data there is an index value determined by each of the statistical process algorithms, the index value being determined from a Fast Fourier Transform algorithm (FFT) determined energy spectral content for that batch;
utilizing a threshold value for each of the statistical process algorithms and the plurality of index values to determine a batch of spectral sensor data of interest that has an index value greater than the threshold value for the associated statistical process algorithm;
sub-dividing the spectral values for the batch of spectral data of interest into a plurality of frequency ranges;
determining a frequency range of interest on the basis of the plurality of spectral sensor values for the batch of spectral sensor data of interest, wherein the frequency range of interest is determined as a frequency range that exhibits a value greater than values associated with the other frequency ranges; and outputting an indication of the frequency range of interest to a user.

16. A non-transitory computer-readable medium having processor-executable instructions stored thereon, wherein the processor-executable instructions, when executed by one or more processors, facilitate:

providing a plurality of batches of temporal sensor data for an item of equipment, wherein each batch of temporal sensor data comprises a plurality of temporal sensor values as a function of time;

processing the plurality of batches of temporal sensor data to determine a plurality of batches of spectral sensor data, wherein each batch of spectral sensor data comprises a plurality of spectral sensor values as a function of frequency;

implementing at least one statistical process algorithm to process the plurality of spectral sensor values for the plurality of batches of spectral sensor data to determine a plurality of index values, wherein for each batch of spectral sensor data there is an index value determined by each of the statistical process algorithms, the index value being determined from a Fast Fourier Transform algorithm (FFT) determined energy spectral content for that batch;

utilizing a threshold value for each of the statistical process algorithms and the plurality of index values to determine a batch of spectral sensor data of interest that has an index value greater than the threshold value for the associated statistical process algorithm;

sub-dividing the spectral values for the batch of spectral data of interest into a plurality of frequency ranges;

determining a frequency range of interest on the basis of the plurality of spectral sensor values for the batch of spectral sensor data of interest, wherein the frequency range of interest is determined as a frequency range that exhibits a value greater than values associated with the other frequency ranges; and outputting an indication of the frequency range of interest to a user.

\* \* \* \* \*